July 21, 1953
C. E. COATES ET AL
2,646,491
SEAM-WELDING APPARATUS
Filed Feb. 1, 1952
2 Sheets—Sheet 2
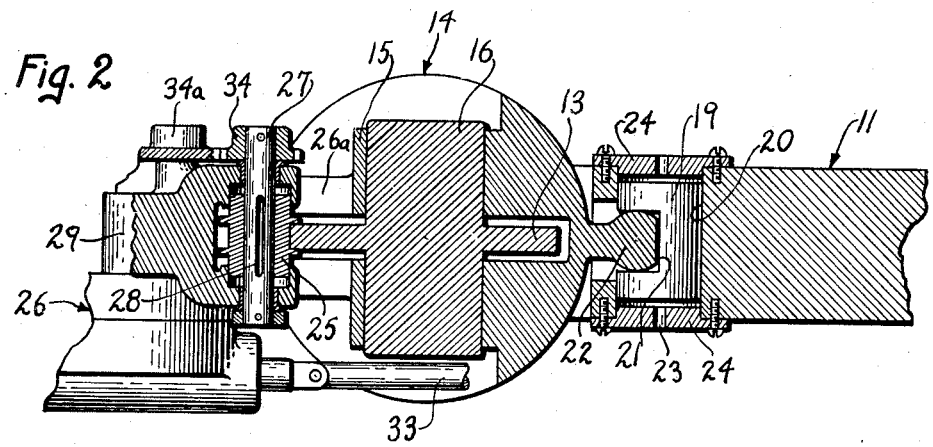
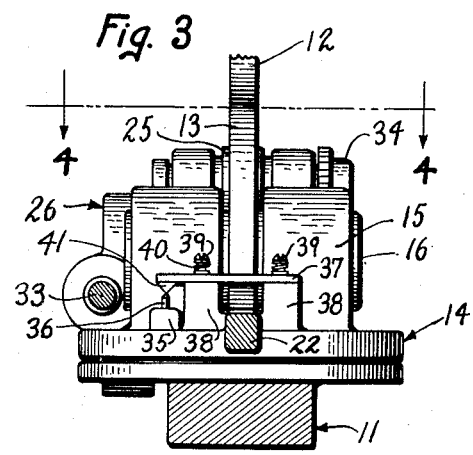
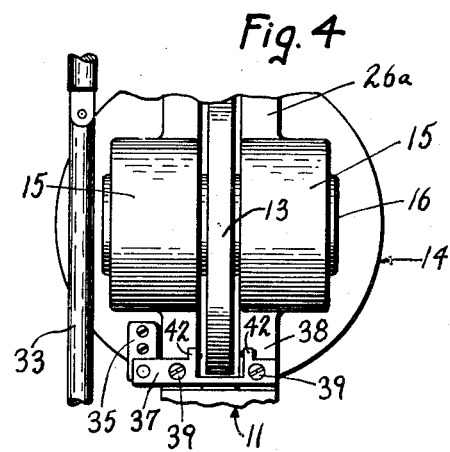
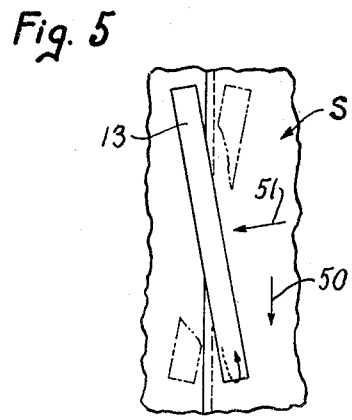
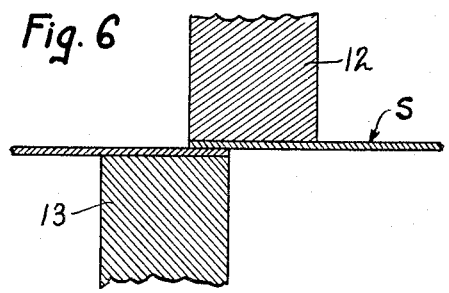
INVENTORS
CLYDE E. COATES
ARTHUR L. WILLIAMS
By *Michael Williams*
Attorney Patented July 21, 1953

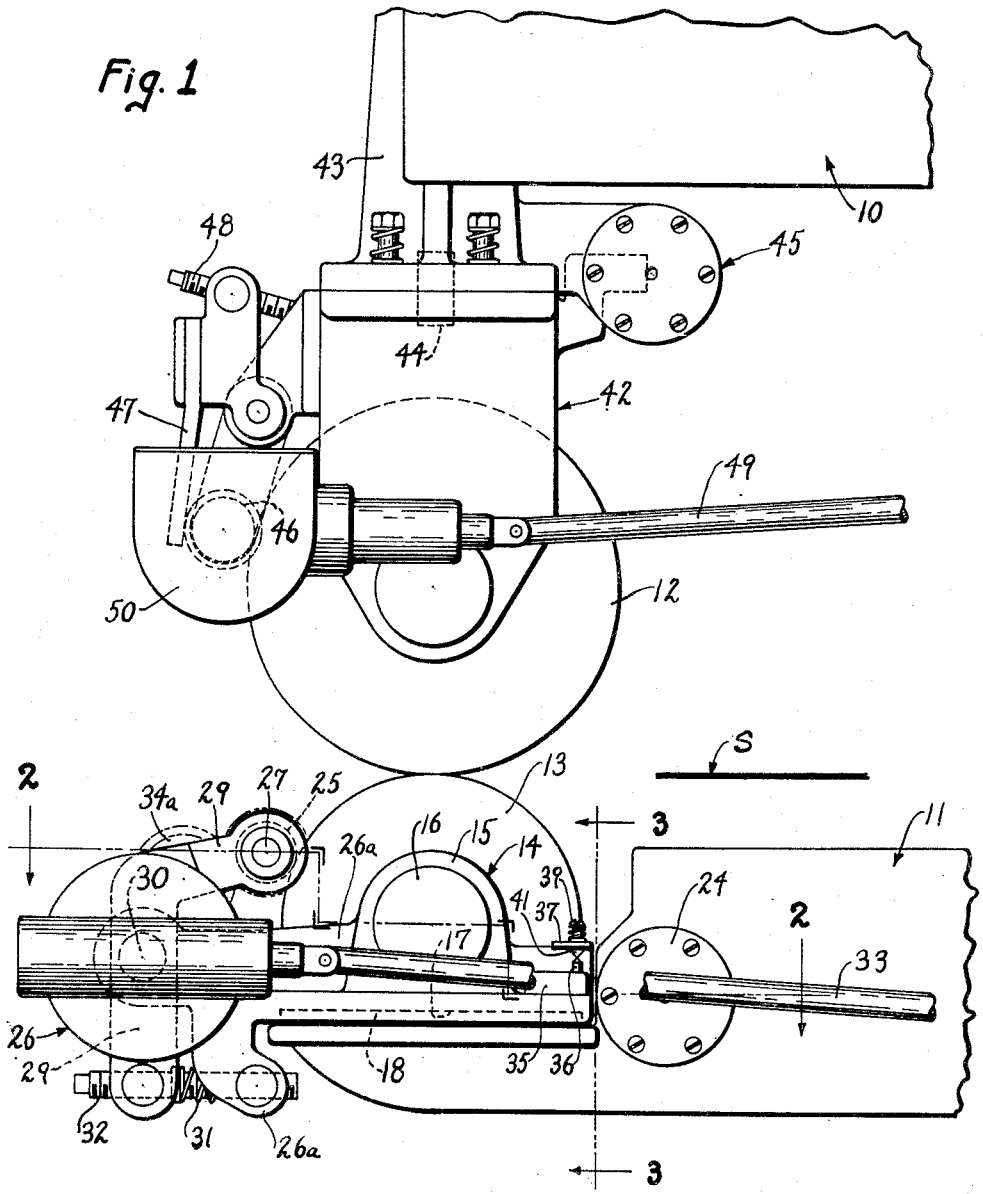

2,646,491

UNITED STATES PATENT OFFICE 2,646,491

SEAM-WELDING APPARATUS

Clyde E. Coates and Arthur L. Williams, Warren, Ohio, assignors to Federal Machine & Welder Company, Warren, Ohio, a corporation of Ohio Application February 1, 1952, Serial No. 269,514

8 Claims. (Cl. 219—4)

The present invention relates to welding apparatus, more particularly to apparatus for seam-welding contiguous edges of sheet material, and the principal object of this invention is to provide new and improved apparatus of the class described.

In the art of seam welding, a serious operational problem is presented by conventional seam-welding apparatus in the rapid wear of the circular welding electrodes. These welding electrode wheels are relatively soft and since they operate under high temperatures and pressures they require frequent dressing to maintain their peripheries at the optimum profile.

The present invention provides seam-welding apparatus in which the wear is evenly distributed across the face of the welding wheel so that superior welds are produced while the frequency of wheel dressing is reduced. This is accomplished by causing the welding wheels to move side-ways back and forth across the weld thus distributing the electrode wear across their working faces. Furthermore, this side movement of the welding wheels is effected with a minimum of side thrust against the work, and therefore little or no force is present to change the overlapping relationship of the contiguous edges of the work.

In the usual seam welder construction, current flows through the bearings supporting the weld wheels and to the wheels and, because of the high current used, it has been found that the electrically conductive, sleeve-type bearings are frequently pitted and wear excessively during operation. Our invention makes it possible to axially move the shaft in the bearings to maintain good electrical contact between the bearings and the weld wheel shaft and thus eliminate or reduce pitting and excessive wear.

In the drawings accompanying this specification and forming a part of this application, there is shown, for purpose of illustration, an embodiment which our invention may assume, and in these drawings:

Figure 1 is a fragmentary, side elevational view illustrating welding apparatus constructed to embody a preferred form of our invention, Figure 2 is a fragmentary sectional view generally corresponding to the line 2—2 of Figure 1, Figure 3 is a sectional view generally corresponding to the line 3—3 of Figure 1, Figure 4 is a fragmentary plan view taken generally along the line 4—4 of Figure 3, Figure 5 is an exaggerated, diagrammatic plan view illustrating the operation of our invention, and Figure 6 is an enlarged sectional view illustrating a position of the welding wheels with respect to the contiguous edges of the sheet material being welded.

As best shown in Figure 1, our improved welding apparatus comprises the usual spaced arms 10 and 11 each carrying a respective welding wheel 12 and 13. The arms 10 and 11 may extend laterally from a main housing (not shown) which may carry the usual welding transformer, controls, drive mechanisms, and other well-known elements not forming a part of this invention.

As best shown in Figures 1 and 2, the lower welding wheel 13 is carried by a wheel support 14 which provides spaced bearings 15 in which the wheel shaft 16 may rotate. It will be appreciated that the usual electrically conductive sleeve inserts (not shown) may be included as part of the bearings 15. As will be apparent, the welding wheel 13 is supported by the bearings 15 in manner to permit the wheel to move axially a limited amount for a purpose later to appear.

In the present embodiment, the wheel support 14 is constructed to provide for pivotal movement between the support and the lower arm 11 and for this purpose has its lower surface formed with a circular recess 17 and a circular projection 18 extends upwardly from the lower arm 11 and into the recess 17. It will now be clear that the foregoing construction provides a pivot about which the wheel support 14 may be swung.

Referring particularly to Figure 2, a piston 19 is slideable within a bore 20 in the lower arm 11. The piston 19 is notched at 21 to receive an arm 22 which projects laterally from the wheel support 14. Apertures 23 are provided in opposed heads 24 for conduits which may be connected thereto and which may carry fluid to and from either side of the piston 19. From the foregoing it will be seen that the wheel support 14 will be swung about its pivot as the piston 19 is shifted by fluid pressure.

Means are presently provided to drive the welding wheel 13 by means of a drive knurl 25 (see Figure 2) which forcibly engages the periphery of the wheel. The associated parts of the drive knurl 25 are collectively indicated by the numeral 26, and as shown in the drawings, the drive knurl mechanism is supported by the wheel support 14 by means of a bracket 26a which is here shown as an integral extension of the wheel support.

The drive knurl 25 has spaced flanges which straddle the wheel 13 and the knurl is slideable axially along its supporting shaft 27 but is held to rotation therewith by means of a key 28. The shaft 27 is rotatable in bearings carried by the furcations of a bifurcated arm 29, and this arm pivots about a shaft 30 which is carried by the bracket 26a. The arm 29 is constantly urged to rotate clock-wise by means of a spring 31 and an adjusting screw 32 so as to press the knurl 25 against the wheel 13. A drive shaft 33 extends outwardly from the main housing and this shaft drives the knurl 25 through a plurality of gears which include gears 34 and 34a.

As best shown in Figures 1, 3 and 4, a switch 35 is provided in the present embodiment to control the admission of fluid under pressure to the piston 19 through a conventional solenoid valve (not shown). The switch 35 is secured to the support 14 and provides an upstanding actuating pin 36. Lugs 38 are formed on the support 14, and a slide 37 is presently secured to the upper surface of the lugs by means of screws 39 which are threaded into the lugs and which pass through elongated apertures in the slide. Springs 40 are interposed between the screw heads and the slide 37 to yieldably hold the slide against the lugs 38.

A button 41 is secured to an extension of the slide 37 and is engageable with the pin 36 (see Figures 1 and 3). As seen in Figure 4, the slide 37 is formed to provide portions 42 which straddle the wheel 13 and which may be alternately contacted by the wheel as it moves in an axial direction from one side to the other.

Referring to Figures 3 and 4, the slide 37 is shown in position whereby button 41 holds the pin 36 depressed. When the wheel 13 moves the slide 37 to the left, the movement of button 41 will clear the pin 36 and will permit the pin to be spring pressed outwardly and thus effect operation of the switch 35. When the wheel 13 moves the slide 37 to the right, the button 41 will again engage the pin 36 and restore the parts to the position shown in the drawings.

The arrangement of the upper welding wheel 12 is similar in all respects to the just described construction of the lower wheel 13. The upper wheel 12 is rotatably carried by a wheel support 42 in manner similar to that provided by support 14. The support 42 is secured to a slide 43 and a fluid cylinder (not shown) may effect vertical movement of the slide 43 and the entire upper wheel assembly. The support 42 pivots about a pin 44 in manner similar to support 14, and a fluid cylinder 45 is secured to the slide 43 to effect pivotal movement of the support 42.

A knurl 46, similar in all respects to knurl 25, is pressed against the upper wheel 12 by a leaf spring 47 and an adjusting screw 48, and the knurl 46 is driven through a drive shaft 49 and gearing within a gear box 50. Although not shown, means similar to that employed with the welding wheel 13 are preferably used to control operation of the fluid cylinder 45.

Since the upper and lower welding wheels operate in similar manner, only the operation of the lower wheel will be described and its operation is as follows:

Upon energization of the welding apparatus, the drive mechanism powering shaft 33 will drive the welding wheel 13 through the knurl drive mechanism 25. At the same time, fluid pressure will be admitted to the piston 19 to move it from the central position in which it is arbitrarily shown in the interest of clarity, to one extreme position or the other depending upon the position of the slide 37.

The sheet material S may be fed between the welding wheels so that the overlapped edges thereof pass between the wheels, and the welding current may then be caused to flow by operation of any suitable means. As shown in Figure 5, the sheet material S is driven by the rotating welding wheels in the direction of the arrow 50 and is held to the straight movement shown by means of guides which are old in the art and therefore have been omitted for clarity. It will be remembered that the piston 19 is being held in one extreme position, and this has shifted the axis of the wheel 13 to the position shown in full lines in Figure 5.

It will now be apparent that because of the shifted axis of the welding wheel with respect to the direction of movement of the sheet material, the resultant force will move the wheel 13 axially in the direction of the arrow 51 without causing any substantial side thrust on the sheet material. The wheel 13 will continue this axial movement until it shifts the slide 37 and actuates the pin 36 of the switch 35. This will cause the solenoid valve to effect movement of the piston 19 to its opposite position, and such movement of the piston will shift the wheel 13 to the dot-dash position shown in Figure 5. The axial movement of the wheel 13 will now be reversed and will continue until the wheel has once again shifted the slide 37 and actuated the switch 35.

As previously mentioned, the upper wheel 12 operates in the same manner as wheel 13. The pivoting and axial shifting of each wheel is completely independent of the other so that there is no tendency to separate the overlapped edges of the sheet material and the wear on each wheel is distributed evenly across its working face.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that our invention is not limited thereto.

We claim:

1. Apparatus for joining contiguous edges of sheet material comprising joining means rotatable about an axis and also shiftable longitudinally of said axis, said joining means being engageable with said contiguous edges in seam-forming relation and rotatable therealong to form said seam, and means for turning the plane of rotation of said joining means.

2. Apparatus for joining contiguous edges of sheet material comprising a pair of welding wheels each rotatable about a respective axis, one of said welding wheels also being shiftable longitudinally of its axis, said welding wheels being engageable with said contiguous edges in seam-forming relation and rotatable therealong to form said seam, and means for turning the plane of rotation of said one welding wheel to effect movement thereof longitudinally of its axis.

3. Apparatus for joining contiguous edges of sheet material comprising a pair of rotatable welding wheels at least one of which is journaled for movement longitudinally of its rotational axis, said welding wheels being engageable with said contiguous edges in seam-forming relation and arranged to drive said contiguous edges therebetween to form said seam, and means for turning the plane of rotation of said one welding wheel to effect movement thereof longitudinally of its axis.

4. Seam welding apparatus comprising a pair of welding wheels engageable with opposite sides of the work, bearings for respective wheels to support said wheels for rotation, at least one of said bearings also providing for movement of its supported wheel longitudinally of its rotational axis, and means for positioning said one wheel so that the plane in which it rotates is out of alignment with the seam of the work, whereby resultant forces set up by said one wheel traversing the work will cause such wheel to move longitudinally of its rotational axis in its bearing.

5. Seam welding apparatus comprising a pair of welding wheels engageable with opposite sides of the work, bearings for respective wheels to support said wheels for rotation, at least one of said bearings also providing for movement of its supported wheel longitudinally of its rotational axis, means for positioning said one wheel in askew relation with the seam of the work, whereby resultant forces set up by said one wheel traversing said work will cause such wheel to move longitudinally of its rotational axis in its bearing in a direction predetermined by the askew relation of such wheel, and means to change the askew relation of said one wheel depending upon the axial position of such wheel.

6. Apparatus for joining contiguous edges of sheet material comprising a pair of welding wheels engageable with said contiguous edges in seam-forming relation and arranged to drive said contiguous edges therebetween to form said seam, support means, wheel-carrying means carried by said support means and rotatably carrying respective welding wheels in manner so that at least one of said welding wheels is movable longitudinally of its rotational axis, at least one of said wheel-carrying means being pivoted to said support means to provide for turning the plane of rotation of said one welding wheel, and means for turning said one wheel-carrying means about its pivot to effect movement of said one welding wheel longitudinally of its rotational axis.

7. Apparatus for joining contiguous edges of sheet material comprising a pair of welding wheels engageable with said contiguous edges in seam-forming relation and arranged to drive said contiguous edges therebetween to form said seam, support means, wheel-carrying means carried by said support means and rotatably carrying respective welding wheels in manner so that at least one of said welding wheels is movable longitudinally of its rotational axis, at least one of said wheel-carrying means being pivoted to said support means to provide for turning the plane of rotation of said one welding wheel, means for turning said one wheel-carrying means about its pivot to effect movement of said one welding wheel longitudinally of its rotational axis, and means for causing said one wheel-carrying means to turn about its pivot when the welding wheel carried thereby has moved a predetermined amount longitudinally of its rotational axis.

8. Apparatus for joining contiguous edges of sheet material comprising a pair of welding wheels engageable with said contiguous edges in seam-forming relation and arranged to drive said contiguous edges therebetween to form said seam, support means, wheel-carrying means carried by said support means and rotatably carrying respective welding wheels in manner so that said welding wheels are movable longitudinally of respective rotational axes, said wheel-carrying means being pivoted to said support means to provide for turning the plane of rotation of said welding wheels from alignment with said contiguous edges, fluid actuated means for turning each wheel-carrying means about its pivot to effect movement of said welding wheels longitudinally of respective rotational axes, and means controling said fluid actuated means for causing each wheel-carrying means to turn about its pivot when the welding wheel carried thereby has moved a predetermined amount longitudinally of its rotational axis.

CLYDE E. COATES.
ARTHUR L. WILLIAMS.

References Cited in the file of this patent

UNITED STATES PATENTS

| Number | Name | Date |
|---|---|---|
| 1,601,929 | Tobey | Oct. 5, 1926 |